United States Patent Office 3,595,807
Patented July 27, 1971

3,595,807
LIQUID CATALYST COMPOSITIONS AND THEIR USE IN THE PRODUCTION OF VINYL ACETATE FROM ETHYLENE
John D. Rushmere, Webster Farms, Del., assignor to E. I. du Pont de Nemours and Company, Wilmington, Del.
No Drawing. Filed Jan. 29, 1969, Ser. No. 795,039
Int. Cl. C07c 67/00
U.S. Cl. 252—429                                    2 Claims

ABSTRACT OF THE DISCLOSURE

Liquid catalyst compositions containing acetic acid, up to 20 weight percent water, a palladium compound catalyst, and salts to provide: copper, chromic (+3) and potassium cations, and acetate and chloride anions. Also, a cyclic method for producing vinyl acetate wherein such a catalyst composition is reacted with ethylene in a first stage to produce vinyl acetate and form cuprous copper which is reoxidized to the cupric state by reacting the catalyst composition with molecular oxygen in a second stage before the catalyst composition is recycled for re-use in the first stage.

BACKGROUND OF THE INVENTION

Methods for producing vinyl acetate by the reaction of ethylene and oxygen with a liquid catalyst composition containing acetic acid, a palladium compound, a copper redox system and a metal acetate are now well known and are described in various patents such as Belgian Pat. 608,610 and British Pats. 966,809, 1,003,396 and 1,121,-103. In such processes, the palladium compound of the catalyst composition is the active catalyst, i.e., it catalyzes the reaction with ethylene to produce vinyl acetate. The copper redox system functions to maintain the palladium compound in its active salt form and the function of the oxygen is to reoxidize cuprous salt formed to its cupric state. As disclosed in the above patents, the ethylene and oxygen may be reacted either simultaneously or separately with the catalyst composition, and in both types of operations, the presence in the catalyst composition of chloride anions and cations other than those of copper and palladium, e.g., alkali metal cations, is generally regarded as advantageous.

Methods in which the catalyst composition is reacted in the same reactor simultaneously with ethylene and oxygen, often referred to as "single-stage" methods, involve the explosive hazards of handling and/or reacting mixtures of ethylene and oxygen. Such hazards are completely avoided in cyclic methods in which the reactions with ethylene and oxygen are carried out separately in separate reactors, which cyclic methods are often referred to as "multi-stage" methods. The catalyst compositions most generally proposed for multi-stage type processes comprise acetic acid, a soluble palladium compound, copper acetate, sodium chloride and, optionally, sodium acetate. Generally, in multi-stage type operations, the catalyst composition, although liquid and fluid, will usually be in the form of a slurry. When such compositions, e.g., slurries, contain a potassium salt in addition to the copper salt, the slurry is very prone to assume the consistency of applesauce, causing frequent and highly objectionable plugging of flow lines and the still employed for removing vinyl acetate product from the catalyst composition. If a sodium salt is used in place of the potassium salt, the reactivity of the composition with ethylene to produce vinyl acetate is rather poor and the plugging of flow lines and the deposition of cuprous chloride on equipment surfaces are serious problems. If the potassium salt is replaced by a lithium salt, by-product formation becomes unduly high and hard, difficult-to-remove deposits of cuprous chloride are formed on the surfaces of the first-stage reactor and the still employed to remove the vinyl acetate product.

British Patent 966,809 discloses single-stage type operations using catalyst compositions which contain a palladium salt and a redox system which may be a salt of copper, chromium or various other metals and catalyst compositions containing both copper and chromium salts are disclosed. However, such compositions contained copper cations at relatively low concentrations and the gram atom ratios of chromium cations:copper cations were relatively high.

The present invention is based upon the discovery of certain liquid catalyst compositions having relatively high contents of copper cations and containing chloride anions, chromic cations and potassium cations in certain proportions which make their use in multi-stage type operations especially advantageous. In particular, their use in multi-stage type operations overcomes or greatly reduces the severity of the problem of cuprous chloride deposition on equipment surfaces, and the problem of feed line plugging. Moreover, their use results in a high productivity of vinyl acetate in the first reaction stage, excellent reoxidation of cuprous cations in the second stage, and chlorination side reactions are reduced.

SUMMARY OF THE INVENTION

The invention relates to certain liquid catalyst compositions and to their use in a multi-stage type operation for producing vinyl acetate from ethylene.

The liquid catalyst compositions of the invention contain acetic acid, up to 20 weight percent water, a palladium compound catalyst and salts to provide copper, chromic (+3) and potassium cations and acetate and chloride anions at concentrations such that the copper cations constitute from about 5 to 15% of the weight of the composition, the gram atom ratio of chloride anions:copper cations is from 0.5–1.5:1, the gram atom ratio of chromic (+3) cations:copper cations is from 0.1–0.5:1 and the gram atom ratio of potassium cations:chromic (+3) cations is from 0.1–1:1.

The method of the invention is a cyclic method for producing vinyl acetate wherein such a liquid catalyst composition is continuously cycled between a first reactor (A) in which it is reacted with ethylene to produce vinyl acetate with at least part of the copper cations of the composition being reduced to the cuprous state, and a second reactor (B) in which the cuprous copper formed in reactor (A) is reoxidized to the cupric state by reaction with molecular oxygen before the composition is recycled to reactor (A), and wherein the vinyl acetate produced in reactor (A) is removed from the catalyst composition before the latter is recycled to reactor (B).

DETAILED DESCRIPTION AND PREFERRED EMBODIMENTS

The essential components of the liquid catalyst compositions of the invention are acetic acid, a palladium compound catalyst, copper chromic (+3) and potassium cations and acetate and chloride anions. The palladium compound catalyst content may be varied considerably but generally should be sufficient to provide palladous cations at a concentration of from about 0.0001 to 10 grams per liter, the preferred concentrations ranging from about 0.01–1 gram per liter. In order that the catalyst composition have a high vinyl acetate synthesis capacity, the concentration of copper cations should generally be at least 5 weight percent, e.g., 5–15 weight percent, the preferred concentrations ranging from about 7–12%. The concentrations of chromic and potassium cations and chloride anions should be such that the gram atom ratio of chloride anions:copper cations is from 0.5–1.5:1, the gram atom ratio of chromic (+3) cations:copper cations is from 0.1–0.5:1 and the gram atom ratio of potassium cations:chromic cations is from 0.1–1:1. The preferred gram atom ratios are: chloride anions:copper cations, 0.1–1.1:1, chromic (+3) cations:copper cations, 0.2–0.4:1; and potassium cations:chromic cations, 0.6–0.8:1.

If the chloride anions:copper cations gram atom ratio is less than indicated above, the reactivity of the catalyst composition both toward ethylene and oxygen will be unduly low for practical operation. On the other hand, if the ratio is higher than indicated above, the formation of chlorinated byproducts becomes excessive. The gram atom ratio of chromic cations:copper cations should be at least 0.1 in order for the beneficial effects of chromic cations to be realized, which effects are a reduction in the formation of chlorinated byproducts and the prevention of, or a substantial reduction in, the deposition of cuprous chloride on the surfaces of the reactor in which vinyl acetate is formed and the stripping still employed to remove the vinyl acetate produced from the catalyst composition. However, chromic cation concentrations to provide a chromic cation:copper cation ration greater than about 0.5:1, result in no added advantages but in heavy slurries. The preferred gram atom ratios of chromic cations:copper cations are about 0.2–0.4:1 since the advantages indicated above for having chromic cations present are realized to the greatest extent when these ratios obtain. It is important that the gram atom ratio of potassium cations:chromic cations be at least 0.1:1, otherwise the rate at which the catalyst composition which has been reacted with ethylene is regenerated by reaction with molecular oxygen will be undesirably low. On the other hand, the ratio should not exceed about 1:1, otherwise the catalyst composition will tend to assume the consistency of applesauce and be prone to frequent and highly objectionable plugging of the flow lines and the stripping still employed for removing vinyl acetate from the catalyst composition. At the preferred ratios from about 0.6–0.8:1, the reaction rates for the reactions of both ethylene and oxygen with the catalyst composition are good, plugging of the composition flow lines is not a problem nor is the deposition of cuprous chloride on equipment surfaces. Furthermore, vinyl acetate is produced with good conversions and yields with significant reduction in the production of chlorinated by-products.

The palladium compound component of the catalyst composition can be supplied as any palladium compound which is sufficiently soluble to provide palladous cations at a concentration within the range indicated above. Examples of such compounds are palladous chloride, palladous acetate and the alkali metal chloropalladites, particularly potassium chloropalladite. Also, metallic palladium, e.g., palladium black, or palladium oxide or carbonate, may be charged to and dissolved in the composition to provide the palladous cations. Palladous chloride and palladous acetate are the most generally preferred sources of the palladous cations.

The copper cations component of the composition is conveniently supplied as cupric or cuprous chloride or acetate, or metallic copper, copper oxide or copper carbonate may be charged to and dissolved in the composition.

The potassium cations will generally be supplied as potassium chloride or potassium acetate, although a potassium compound, such as the hydroxide or carbonate, which will dissolve in the composition may also be used.

The chromic cations component of the catalyst composition will generally and preferably be supplied thereto in the form of chromic chloride or chromic acetate. However, since under the conditions of use, chromous salts are oxidized to the chromic form, i.e., to provide the required chromic (+3) cations, chromous chloride and chromous acetate can be added initially to the catalyst composition. Chromites such as potassium chromite, chromyl chloride and chromates and dichromates such as potassium chromate and potassium dichromate, as well as chromium dioxide ($CrO_2$) and chromium trioxide ($CrO_3$) can also be added to the catalyst composition as sources of the required chromic cations, since they become reduced to the chromic (+3) state under the conditions of use of the catalyst composition.

The anion components of the copper and other metal salt components of the catalyst composition preferably will supply chloride anions to provide the chloride anions:copper cations gram atom ratios indicated previously, with the balance of the anion requirements of those salts being acetate anions. However, other anions, such as sulfate anions, may also be present.

The conditions under which the catalyst composition is employed to produce vinyl acetate in accordance with the method of the invention will be generally those conditions well-known to be suitable for using liquid catalyst compositions of this general type. Thus, the reaction of the catalyst composition with ethylene in a first reaction stage to produce vinyl acetate and catalyst composition in its reduced state, i.e., a state in which at least part of the copper cations are in the cuprous state, may be effected at a temperature ranging from about room temperature to about 200° C. and at an ethylene pressure of about 1–100 atmospheres or higher. Preferably, the temperature will range from about 50–130° C. and the ethylene pressure from about atmospheric to 50 atmospheres, it being understood that the pressure should be sufficient to maintain liquid phase conditions under the chosen temperature condition. Following the reaction with ethylene, the vinyl acetate produced, generally together with by-product acetaldehyde, will be treated to remove the vinyl acetate and by-product acetaldehyde. This is conveniently done by cycling the catalyst composition from the reactor in which the vinyl acetate is produced to a stripping still from which the vinyl acetate and by-product acetaldehyde are taken off as overhead products and the stripped catalyst composition is taken off as bottoms product. The latter, generally referred to as the reduced catalyst composition since it contains copper in the cuprous form, is then cycled to a regenerator in which it is reacted with molecular oxygen to effect reoxidation of the cuprous copper to the cupric state. The use of air, oxygen, or oxygen-enriched air for this purpose at a temperature of at least 50° C., e.g., 50–150° C., preferably 80–130° C., is effective. Partial oxygen pressures of about 0.01–2 atmospheres or higher are generally suitable. The preferred partial oxygen pressures are from about 0.1–1 atmosphere. The use of air at a total pressure of 0 to 200 p.s.i.g. is convenient.

The purpose of the reaction of the reduced catalyst composition with molecular oxygen as indicated is to regenerate the catalyst composition, i.e., to reoxidize cuprous copper to the cupric state. Since the over-all reaction of the cyclic method consumes 1 mole of acetic acid and produces 1 mole of water per mole of vinyl acetate product, make-up acetic acid must be added to the catalyst composition and water must be removed therefrom somewhere in the cycle in order for continuous operation to be successful. The make-up acetic acid may be added at any desired point in the cycle, a generally convenient point being between the regenerator reactor and the reactor in which ethylene is reacted to produce vinyl acetate. A convenient procedure is to add the make-up acetic acid to the catalyst composition after it has been reacted with oxygen to reoxidize cuprous copper to the cupric state and after the composition has been degassed, but before it is recycled to the first reactor where the reaction with ethylene is effected.

As indicated previously, acetaldehyde is usually obtained as a by-product and the amount of such by-product obtained is determined to a major extent by the water content of the catalyst composition when it is undergoing the reaction with ethylene. Water contents greater than about 20% seldom will be employed and, most generally, the water content will vary from about 0.5–20 weight percent. The preferred water content will generally range from about 3–12%. Since water is a product of the reaction with oxygen to convert cuprous copper to the cupric state, some water must be removed from the catalyst composition in the cycle in order to maintain the water content at the desired level. Generally, sufficient water to accomplish this objective will be removed along with the vinyl acetate and acetaldehyde by-product in the stripping still so that removal of water from any other point in the cycle will not usually be necessary. Of course, as is well known, acetic anhydride may be supplied to the catalyst composition at any desired point in the cycle to effect conversion of at least part of the water to acetic acid and thereby simultaneously effect a reduction in the water content and also supply at least part of the make-up acetic acid requirement.

The compositions and methods of the invention are illustrated by the following examples in which all concentrations or proportions expressed as percentages are by weight. Also, gram atom ratios of the various anion components of catalyst compositions are indicated for simplicity reasons as atomic rather than ionic ratios, e.g., the gram atom ratio of chloride anions:copper cations is indicated simply as the Cl:Cu ratio.

EXAMPLES

Various catalyst composition charges were prepared using acetic acid, a small amount of water, palladous chloride, cupric acetate dihydrate, chromic chloride and potassium chloride in proportions to provide compositions containing about 0.1% $PdCl_2$, about 10% cupric cations, about 10% water and the cupric, chromic and potassium salts in the proportions to provide the gram atom ratios indicated in the tabulation below, with the balance of each composition charge being acetic acid. The use of each catalyst charge to produce vinyl acetate was tested in an apparatus whose four main sections were constructed of titanium and consisted of (1) a stirred synthesis vessel, (2) a product stripping still, (3) a catalyst regenerator vessel, and (4) a catalyst degasser, all arranged in a closed loop through which the catalyst composition (a slurry) was cycled continuously from section to section in the order listed. Each section of the apparatus held, at any given time, roughly one-fourth of the entire catalyst charge in the loop. The system included pumps, valves, heaters, coolers, etc., as required to permit the feeding of ethylene to the synthesis reactor section and air to the catalyst regenerator section, the removal of spent gases through reflux condensers and the maintaining of the desired temperatures, pressures, and material flows, etc., as required for continuous operation. The synthesis reactor was operated at a temperature of about 120° C. and an ethylene pressure of about 200 p.s.i.g., and the catalyst regenerator was operated at a temperature of about 130° C. and an air pressure of about 200 p,s.i.g. The stripper still was operated to separate vinyl acetate and acetaldehyde by-product together with sufficient water so as to maintain the water content of the catalyst composition at about 10%. Make-up acetic acid was added to the cycling catalyst composition at a point in the loop between the degassing vessel and the synthesis reactor.

The gram atom ratios for the catalyst compositions tested are tabulated below:

|  | Gram atom ratios | | | |
| --- | --- | --- | --- | --- |
|  | Cr:Cu | K:Cu | K:Cr | Cl:Cu |
| Example: |  |  |  |  |
| 1 | 0.3:1 | 0.2:1 | 0.67:1 | 0.7:1 |
| 2 | 0.2:1 | 0.6:1 | 3:1 | 1:1 |
| 3 | 0.1:1 | 0.8:1 | 8:1 | 1:1 |
| 4 | 0.4:1 | 0.3:1 | 0.75:1 | 9.9:1 |

The catalyst composition used in Examples 2 and 3 were found in the tests to be inoperable since severe plugging of flow lines resulted promptly upon starting of the tests. The composition employed in Example 4 was found to be marginally operative since flow line plugging occurred, but not frequently enough to render the composition completely inoperative. In contrast, the composition of Example 1 was found to be highly practical and permitted continuous operation for an extended period of time with excellent overall results. Thus, during continuous operation for eight days, not one stoppage was required as a result of line plugging. Furthermore, loss of copper from the catalyst composition due to deposition of cuprous chloride on the walls of the synthesis vessel was at the rate of only 0.04 weight percent copper per hour, based on the total copper content of the initial catalyst composition charge, as measured over three operating periods, each of about 50 hours. Cuprous chloride depositions at rates of from 0.1–0.3 weight percent copper per hour and higher were commonly experienced with similar catalyst compositions in which the metal cations other than palladium and copper were alkali metal cations, e.g., sodium, potassium or lithium cations. Conversions across the system in Example 1 averaged 86% based upon the available chloride. This high conversion indicated that both the synthesis and regeneration reactions were proceeding at high rates with good productivity of vinyl acetate and at high rates with good productivity of vinyl acetate and acetaldehyde.

When compositions similar to those in the above examples were prepared in which all of the cupric cations were supplied initially as cupric acetate and all chloride anions other than those derived from the palladous chloride were supplied as chromic chloride and the compositions were devoid of other metal cations, such compositions were found to result in vinyl acetate production with a reduction in the normal formation of chlorinated by-products. However, very poor copper conversions and low yields of vinyl acetate resulted and the rate at which the reduced compositions were regenerated by reaction with air was unacceptably low.

When compositions similar to those of the above examples were tested, in which compositions potassium chloride was used as the sole chloride donor other than the palladous chloride, the loss of copper due to deposition of cuprous chloride on the walls of the synthesis reactor was very rapid and the composition assumed the consistency of applesauce, resulting in severe plugging throughout the process lines. Such applesauce consistency apparently was the result of the formation of long fibrous needles of a crystal complex between potassium salts and cuprous chloride. The plugging of process lines was so severe that over the test period the operations had to be shut down 45% of the time due to such plugging.

The compositions of the invention and their use in the production of vinyl acetate are based upon the discovery that by using both chromic cations and potassium cations in suitable proportions in the composition, the disadvantages noted above when each is used alone to supplement the copper cations are essentially completely overcome, provided the gram atom ratios of potassium cations: chromic cations are properly adjusted as are also the proportions of these cations to the cupric cations and chloride anions that are also present. Thus, when combining potassium and chromic cations in the catalyst composition according to the invention, the adavantages of the low rate of chlorinated by-product formation resulting from the chromic cations, and high reactivities in both the synthesis and regeneration stages are realized without encountering the cuprous chloride deposition and flow line plugging problems.

I claim:

1. A liquid catalyst composition suitable for use in the production of vinyl acetate by the reaction of ethylene therewith, said composition consisting essentially of acetic acid, up to 20 weight percent water, a palladium compound catalyst providing palladous cations at a concentration of 0.0001 to 10 grams per liter and salts to provide copper, chromic (+3) and potassium cations and acetate and chloride anions at concentrations that the copper cations constitute from about 5–15 weight percent of the composition, the gram atom ratio of chloride anions:copper cations is from 0.5–1.5:1, the gram atom ratio of chromic (+3) cations:copper cations is from 0.1–0.5:1 and the gram atom ratio of potassium cations:chromic (+3) cations is from 0.1–1:1.

2. A composition according to claim 1 wherein the water content is 3–12 weight percent, the copper cation content is 7–12 weight percent, the gram atom ratio of chloride anions:copper cations is from 0.7–1.1:1, the gram atom ratio of chromic (+3) cations:copper cations is from 0.2–0.4:1 and the gram atom ratio of potassium cations:chromic (+3) cations is from 0.6–0.8:1.

References Cited
UNITED STATES PATENTS

| | | | |
|---|---|---|---|
| 3,119,874 | 1/1964 | Paszthory et al. | 252—429X |
| 3,121,673 | 2/1964 | Riemenschneider, et al. | 252—429X |
| 3,410,807 | 11/1968 | Lloyd | 252—429 |

PATRICK P. GARVIN, Primary Examiner

U.S. Cl. X.R.

260—497